United States Patent
Woelk et al.

(10) Patent No.: US 7,012,935 B2
(45) Date of Patent: Mar. 14, 2006

(54) ALIGNMENT AND DESKEW DEVICE, SYSTEM AND METHOD

(75) Inventors: Heiko Woelk, Hamburg (DE); Aage Fischer, Hamburg (DE); Nils Hoffmann, Hamburg (DE)

(73) Assignee: Intel Corporation, Santa Clara, CA (US)

( * ) Notice: Subject to any disclaimer, the term of this patent is extended or adjusted under 35 U.S.C. 154(b) by 555 days.

(21) Appl. No.: 10/150,369

(22) Filed: May 16, 2002

(65) Prior Publication Data

US 2003/0214975 A1 Nov. 20, 2003

(51) Int. Cl.
- *H04J 3/06* (2006.01)
- *H04J 3/02* (2006.01)
- *H04L 7/00* (2006.01)
- *H04L 25/00* (2006.01)

(52) U.S. Cl. .................. 370/503; 370/509; 370/517; 370/539; 375/365; 375/371

(58) Field of Classification Search .......... 370/463, 370/419, 428, 412, 503, 535, 540, 509, 508, 370/517, 518; 709/223, 250, 230, 236; 710/5, 710/65, 129, 126; 375/365, 369, 371; 714/700, 714/718

See application file for complete search history.

(56) References Cited

U.S. PATENT DOCUMENTS

| | | | | |
|---|---|---|---|---|
| 4,788,681 A | * | 11/1988 | Thomas et al. | 370/509 |
| 5,157,530 A | * | 10/1992 | Loeb et al. | 398/79 |
| 5,313,501 A | * | 5/1994 | Thacker | 375/369 |
| 5,517,627 A | * | 5/1996 | Petersen | 710/316 |
| 5,687,328 A | * | 11/1997 | Lee | 710/307 |
| 5,774,697 A | * | 6/1998 | Hall | 711/141 |
| 5,822,620 A | * | 10/1998 | Malik et al. | 712/300 |
| 6,031,847 A | * | 2/2000 | Collins et al. | 370/508 |
| 6,279,044 B1 | * | 8/2001 | Niu et al. | 710/5 |
| 6,536,025 B1 | * | 3/2003 | Kennedy et al. | 716/6 |
| 6,625,675 B1 | * | 9/2003 | Mann | 710/61 |

OTHER PUBLICATIONS

Supplement to Carrier Sense Multiple Access with Collision Detection (CSMA/CD) Access Method and Physical Layer Specifications–Media Access Control (MAC) Parameters, Physical Layer, and Management Parameters for 10 Gb/s Operation, IEEE P802.3ae/D4.3, Apr. 15, 2002, clauses 46 and 47.

Carrier Sense Multiple Access with Collision Deteciton (CSMA/CD) Access Method and Physical Layer Specifications, IEEE standard 802.3—2000, clause 36.

XAUI/XGXS Proposal, IEEE 802.3ae Task Force, Mar. 6, 2000.

White Paper on OIF Electrical Interfaces, Optical Internetworking Forum.

System Packet Interface Level 5 (SPI–5): OC–768 System Interface for Physical and Link Layer Devices, Implementation Agreement OIF SPI5 010 Nov. 2001.

* cited by examiner

Primary Examiner—Man Phan
(74) Attorney, Agent, or Firm—Paul G. Nagy (57) ABSTRACT

A device, system and method for aligning data received on a plurality of data lanes in a data link are disclosed. One or more alignment vectors are generated for each of a plurality of data lanes where each alignment vector represents a location of an alignment character in an associated one of the data lanes. For each data lane, a plurality of alignment vectors may be associated with one or more alignment windows associated with the data lane. If the alignment vectors of the data lanes are associated with a common alignment window, an alignment position may be selected for each data lane.

28 Claims, 8 Drawing Sheets

ALIGNMENT AND DESKEW DEVICE, SYSTEM AND METHOD

BACKGROUND

1. Field

The subject matter disclosed herein relates to data communication. In particular, the subject matter disclosed herein relates to data communication in a data link.

2. Information

Data transmission standards directed to high speed communication over optical transmission media such as 10 and 40 Gigabit Ethernet, or Synchronous Optical Network/Synchronous Digital Hierarchy (SONET/SDH) have brought about a need for high speed communication between components or modules in systems employing such standards. For example, IEEE P802.3ae defines a 10 Gigabit Attachment Unit Interface (XAUI) to transmit data between 10 Gigabit Media Independent Interfaces (XGMIIs) through a data link. Also, the Optical Internetworking Forum (OIF) defines System Packet Interfaces (SPIs) at Levels SPI-1 through SPI-5 for different data rates.

Serial links typically transmit encoded symbols on each of a plurality of parallel data lanes coupled between a source and destination. Symbols received from each data lane at the destination are typically decoded to provide bits to be combined with decoded data received from other data lanes. Due to physical characteristics of the data link, the data received from the data lanes may become temporally misaligned or skewed. Accordingly, symbols or decoded data received from the data lanes is typically re-aligned or deskewed prior to combining. Alignment character symbols are typically inserted in to data lanes to enable realignment of the data lanes at a destination as described in IEEE standard 802.3—2000, clause 36.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Machine-readable" instructions as referred to herein relates to expressions which may be understood by one or more machines for performing one or more logical operations. For example, machine-readable instructions may comprise instructions which are interpretable by a processor compiler for executing one or more operations one or more data objects. However, this is merely an example of machine-readable instructions and embodiments of the present invention are not limited in this respect.

"Machine-readable medium" as referred to herein relates to media capable of maintaining expressions which are perceivable by one or more machines. For example, a machine readable medium may comprise one or more storage devices for storing machine-readable instructions. Such storage devices may comprise any type of storage media including, for example, optical, magnetic or semiconductor storage media. However, these merely examples of a machine-readable medium and embodiments of the present invention are not limited in this respect.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments of the present invention are not limited in this respect.

A "data link" as referred to herein relates to circuitry to transmit data between devices. A data link may provide point to point communication between two devices in either unidirectionally or bi-directionally. However, this is merely an example of a data link and embodiments of the present invention are not limited in this respect.

A data link may comprise a plurality of "data lanes" where each data lane transmits data from a source to a destination independently of other data lanes. Each data lane in a data link may transmit symbols in a transmission medium which are decoded into data bits at a destination. The decoded bits from the data lanes may then be combined. However, this is merely an example of data lanes that may be used to transmit data in a data link and embodiments of the present invention are not limited in these respects.

Data or symbols received from a data lane at a destination of a serial data link may be partitioned into "temporal segments" of a predetermined length. For example, symbols received from a data lane may be decoded into bits to be provided on data cycles at a parallel interface as temporal segments. Also, bits from decoded symbols provided at such a parallel interface may be further partitioned into additional temporal segments. However, these are merely examples of how data received from a data lane may be partitioned into temporal segments and embodiments of the present invention are not limited in these respects.

An "alignment character" as referred to herein relates to a symbol inserted among symbols transmitted in a data lane to provide a temporal alignment reference to symbols transmitted in other data lanes. For example, a destination may receive a plurality of data lanes of a data link where an alignment character is periodically inserted among the symbols transmitted in each data lane. If the data from the data lanes is temporally skewed, the destination may align the data received from the data lanes according to the inserted alignment characters. However, this is merely an example of an alignment character and embodiments of the present invention are not limited in this respect.

An "alignment vector" as referred to herein relates to information indicating a location of an alignment character within a segment of symbols transmitted in a data lane. For example, an alignment vector may indicate which symbol among a segment of symbols comprises an alignment character. An alignment vector may also indicate a location of an alignment character in a bit stream generated from decoding segment of symbols transmitted in a data lane. However, these are merely examples of an alignment vector and embodiments of the present invention are not limited in these respects.

An "alignment position" as referred to herein relates to a temporal orientation of data from a data lane in reference to data in at least one other data lane. For example, a serial data link may transmit data in data lanes that is temporally skewed with respect to one another. An alignment position may be selected for one or more of the skewed data lanes such that the data lanes are temporally aligned. However, this is merely an example of an alignment position and embodiments of the present invention are not limited in this respect.

An "alignment window" as referred to herein relates to a temporal range over which an alignment character of each data lane of a data link may be detected or located. For example, alignment characters of respective data lanes may be detected or located in a "common alignment window" such that an alignment position for each data lane may be selected. However, these are merely examples of an alignment window and common alignment window, and embodiments of the present invention are not limited in these respects.

Briefly, embodiments of the present invention relate to a device, system and method for aligning data received on a plurality of data lanes in a data link. One or more alignment vectors are generated for each of a plurality of data lanes where each alignment vector represents a location of an alignment character in an associated one of the data lanes. For each data lane, a plurality of alignment vectors may be associated with one or more alignment windows associated with the data lane. If the alignment vectors of the data lanes are associated with a common alignment window, an alignment position may be selected for each data lane. However, this is merely an example embodiment and embodiments of the present invention are not limited in this respect.

Figure 1A:
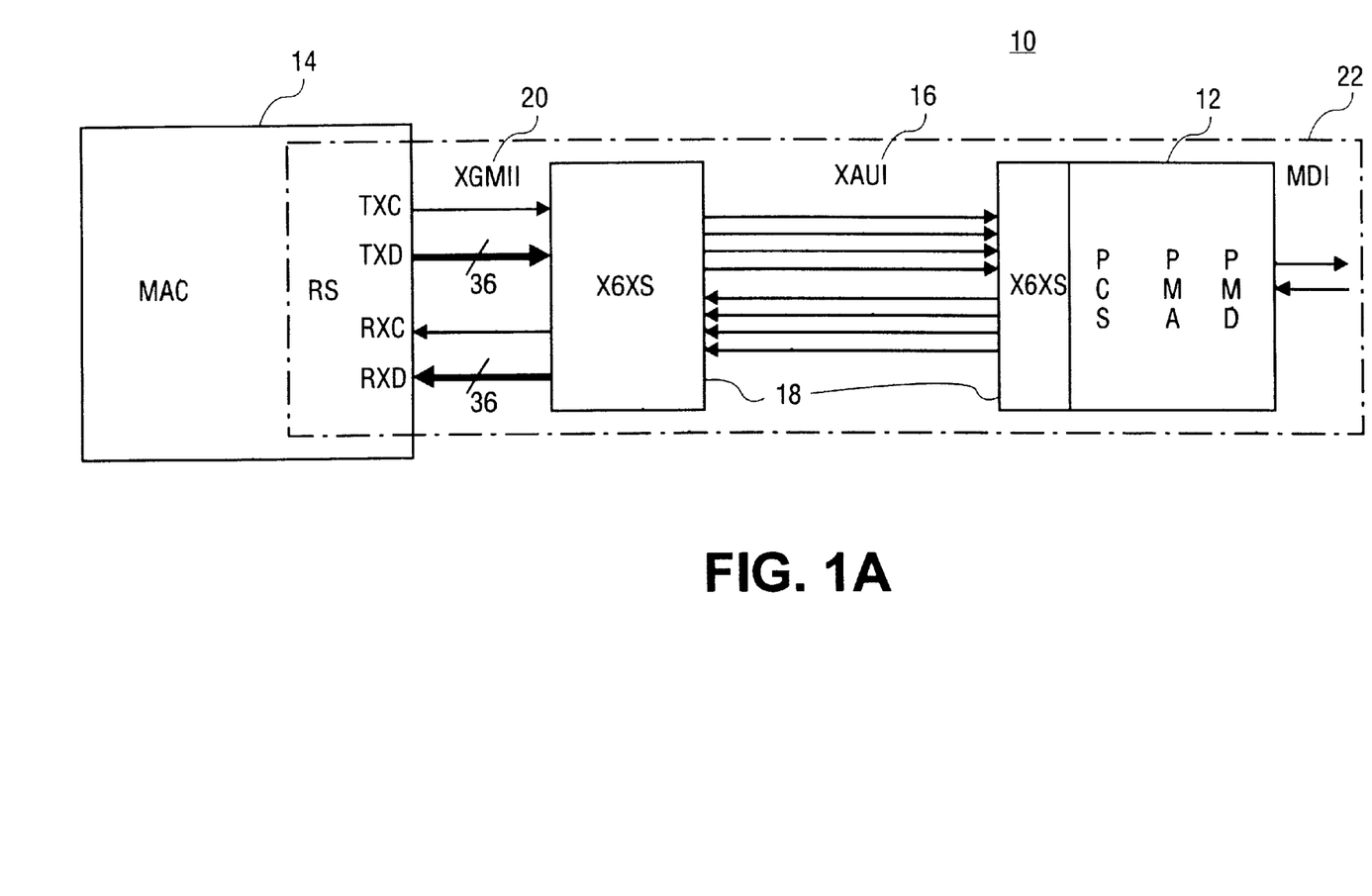
FIG. 1A shows a system to transmit data between two points in data lanes according to an embodiment of the present invention.

FIG. 1A shows a system 10 to transmit data between two points in data lanes according to an embodiment of the present invention. A data transceiver 12 may transmit data to or receive data from a transmission medium through a media dependent interface (MDI) 22. For example, the data transceiver 12 may comprise a physical medium attachment (PMA) and physical medium dependent (PMD) and physical coding sublayer (PCS) sections to communicate with an optical transmission medium according to IEEE standard 802.3ae, clauses 48 through 51.

The system 10 may also comprise a media access control (MAC) device 14 to communicate with the data transceiver 12 through a media independent interface (MII) such as a 10 Gigabit MII (XGMII) 20 formed according to IEEE standard 802.3ae, clause 46. The MAC device 14 may also be coupled to any one of several types of input/output systems such as, for example, a multiplexed data bus or a switch fabric. However these are merely examples of how a MAC device may be integrated with a communication platform and embodiments of the present invention are not limited in these respects.

The MAC device 14 and data transceiver 12 may be coupled to the data transceiver 12 by a serial data link such as 10 Gigabit Attachment Unit Interface (XAUI) 16 formed according to IEEE standard 802.3ae, clause 47. XAUI 16 may comprise first and second XGMII extender sublayer (XGXS) circuits 18. The first and second XGXS circuits 18 may be coupled on a printed circuit board by traces extending up to approximately 50 cm. in a backplane configuration. However, this is merely an example of how a MAC device may be coupled to a data transceiver over a data link and embodiments of the present invention are not limited in these respects.

In the illustrated embodiment, the XGXS circuits 18 may transmit data across the XAUI 16 in multiple data lanes where each data lane transmits data in a particular direction either toward or away from the data transceiver 12. In the illustrated embodiment, data transmitted in different lanes in a time period to an XGXS circuit 18 may be recombined. Accordingly, the XGXS circuits 18 may deskew data transmitted on different data lanes to maintain proper alignment of the data received on the different data lanes.

Figure 1B:
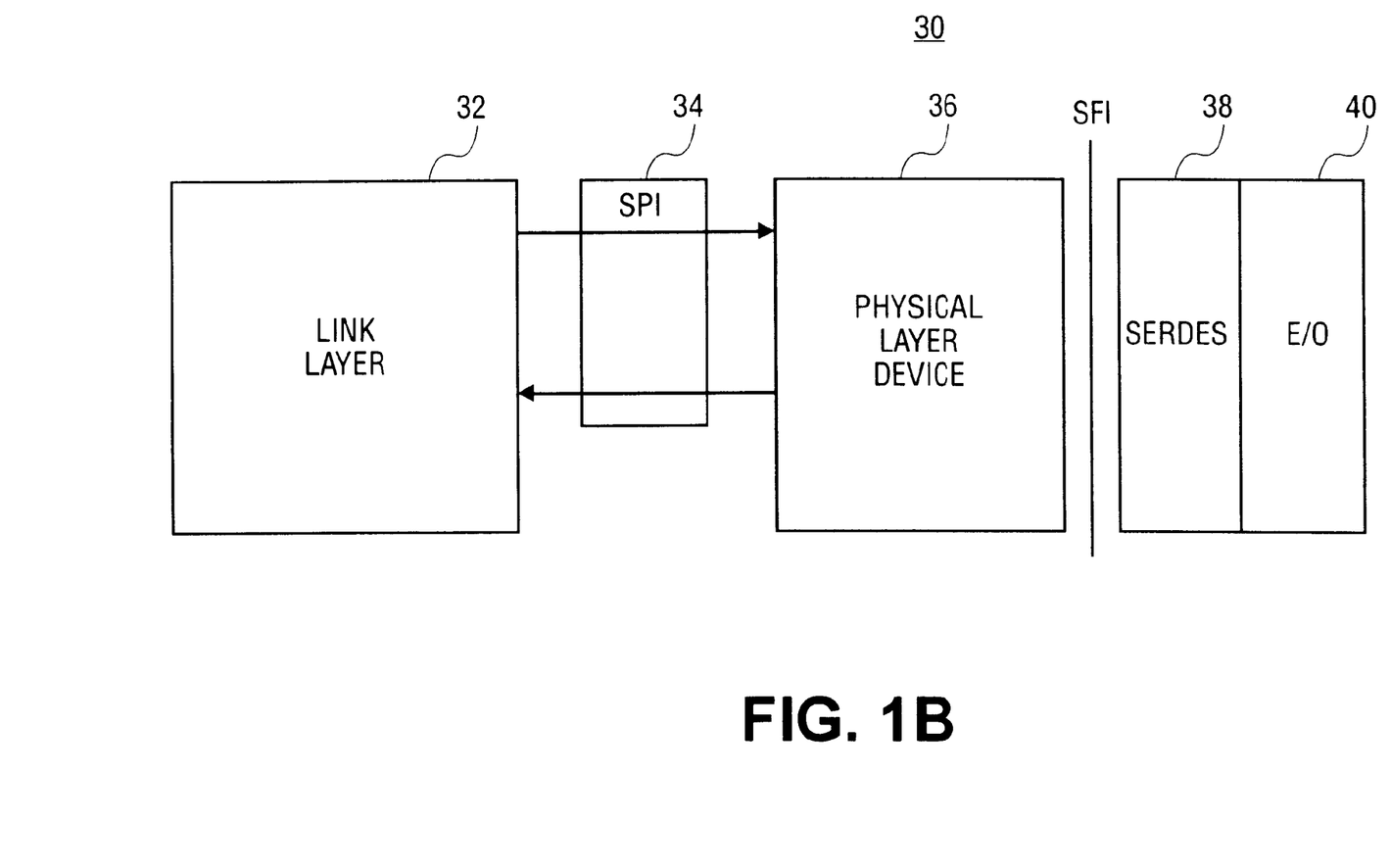
FIG. 1B shows a system to transmit data between two points in data lanes according to an alternative embodiment of the present invention.

FIG. 1B shows a system 30 to transmit data between two points in data lanes according to an alternative embodiment of the present invention. A physical layer device 36 may transmit data to or receive data from an optical transmission medium (not shown) through a serializer/deserializer (SERDES) 38 and optical transceiver 40. The physical layer device may comprise a framer (not shown) and forward error correction logic (not shown) to transmit or receive data according to any one of several formats provided by Asynchronous Transfer Mode (ATM) or SONET/SDH communication systems. However, these are merely examples of communication systems that may be supported by a framer and forward error correction and embodiments of the present invention are not limited in these respects. The SERDES 38 and physical layer device 36 may transmit data across a SERDES Framer Interface (SFI).

The physical layer device 36 may be coupled to a link layer device 32 over a backplane by a System Packet Interface (SPI) 34 as defined by the Optical Internetworking Forum (OIF). The link layer device 32 may be coupled to any one of several input/output systems (not shown) in a communication platform such as, for example, a switch fabric or a multiplexed bus. The link layer device 32 may also comprise packet forwarding logic such as a network processing element or packet classification ASIC.

The SPI 34 comprises a plurality of data lanes to transmit data each direction between the link layer device 32 and physical layer device 36. In the illustrated embodiment, data transmitted through the SPI 34 in different lanes may be recombined. Accordingly, a destination end of the SPI 34 may deskew data transmitted on different data lanes to maintain proper alignment of the data received on the different data lanes.

Figure 2:
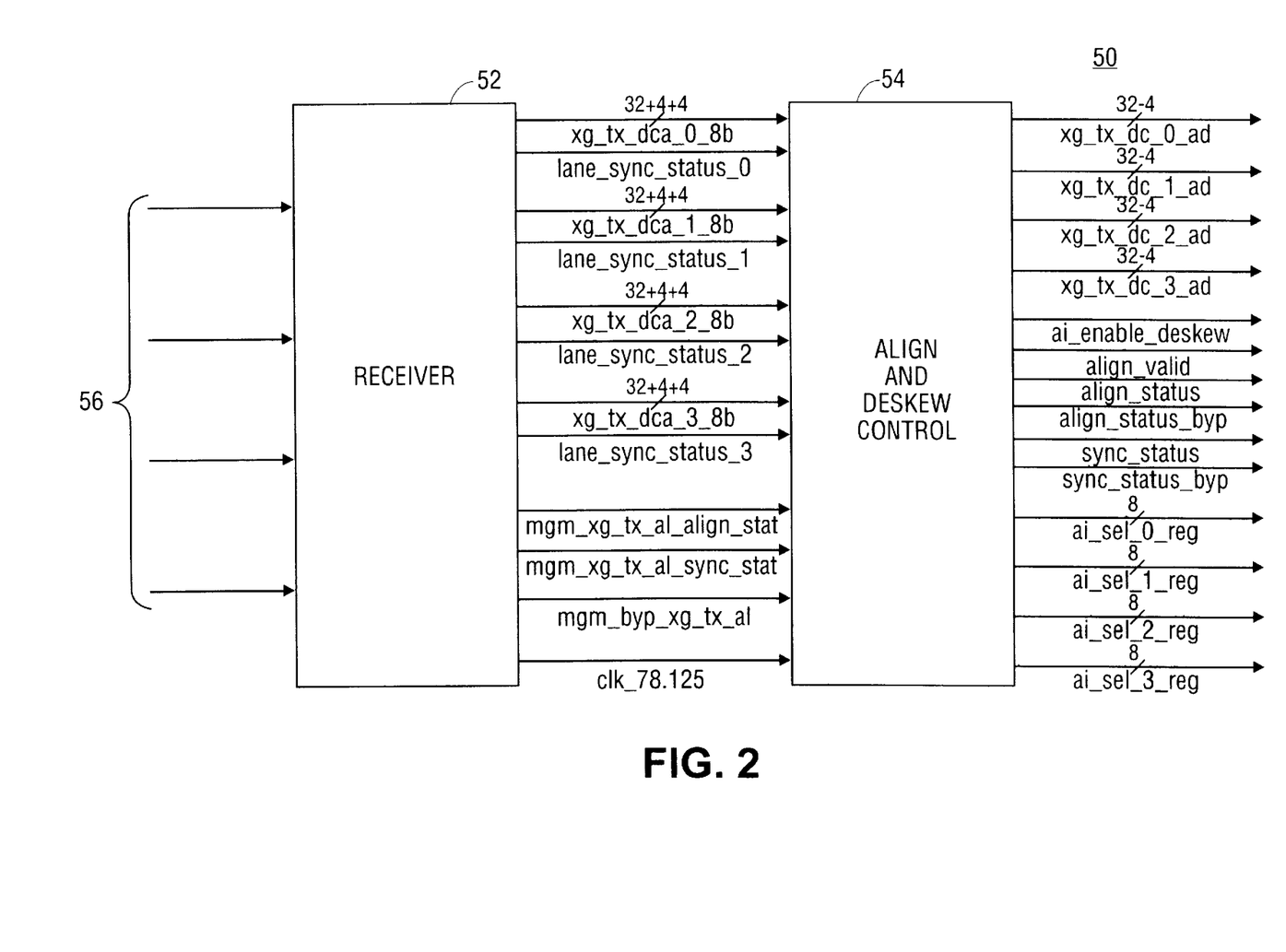
FIG. 2 shows a receiving portion at a destination of a data link according to an embodiment of the present invention.

FIG. 2 shows a receiving portion of a destination device coupled to a data link according embodiments of the system 10 shown in FIG. 1A or system 30 shown in FIG. 1B which may be used to deskew data received on different data lanes. A receiver 52 may receive encoded data (e.g., encoded in symbols) on four data lanes of a serial link where each data lane is transmitted on a corresponding one of four differential pairs 56. The receiver 52 may comprise, for example, a symbol decoder, a deserializer, a synchronization unit and a bit alignment unit. The data on each of the four differential pairs includes a periodic alignment character indicating an alignment of the data received one data lane relative to data received on any of the other three data lanes.

The receiver 52 may decode signals on the differential pairs to provide a plurality of synchronously clocked parallel bits for each of the four data lanes and a lane_sync_status bit to ensure proper bit level alignment on data cycles. Data received on the differential pairs 56 may be encoded according to an 8b/10b encoding scheme known to those of ordinary skill in the art. Accordingly, the receiver 52 may decode symbols from the differential pairs using the 8b/10b decoding scheme. In the presently illustrated embodiment, a temporal segment of forty parallel bits is provided on for each data lane on data cycles. These forty bits in temporal segments may include including thirty-two data bits, four control bits and four bits comprising an alignment vector. An alignment and deskew control section 54 receives the forty parallel bit output for each data lane and provides a corresponding output of thirty-two data bits and four control bits.

The alignment vector comprises four alignment flags where each alignment flag comprises a bit corresponding with a portion of a temporal segment. A "1" at a position in the alignment vector indicates a presence of the alignment character in a corresponding portion (e.g., ten bits) of the forty parallel data bits while "0" indicates an absence of the alignment character in the corresponding portion. However, this is merely an example of how an alignment vector may comprise information to represent a location of an alignment character in a data lane, and embodiments of the present invention are not limited in this respect.

Figure 3:
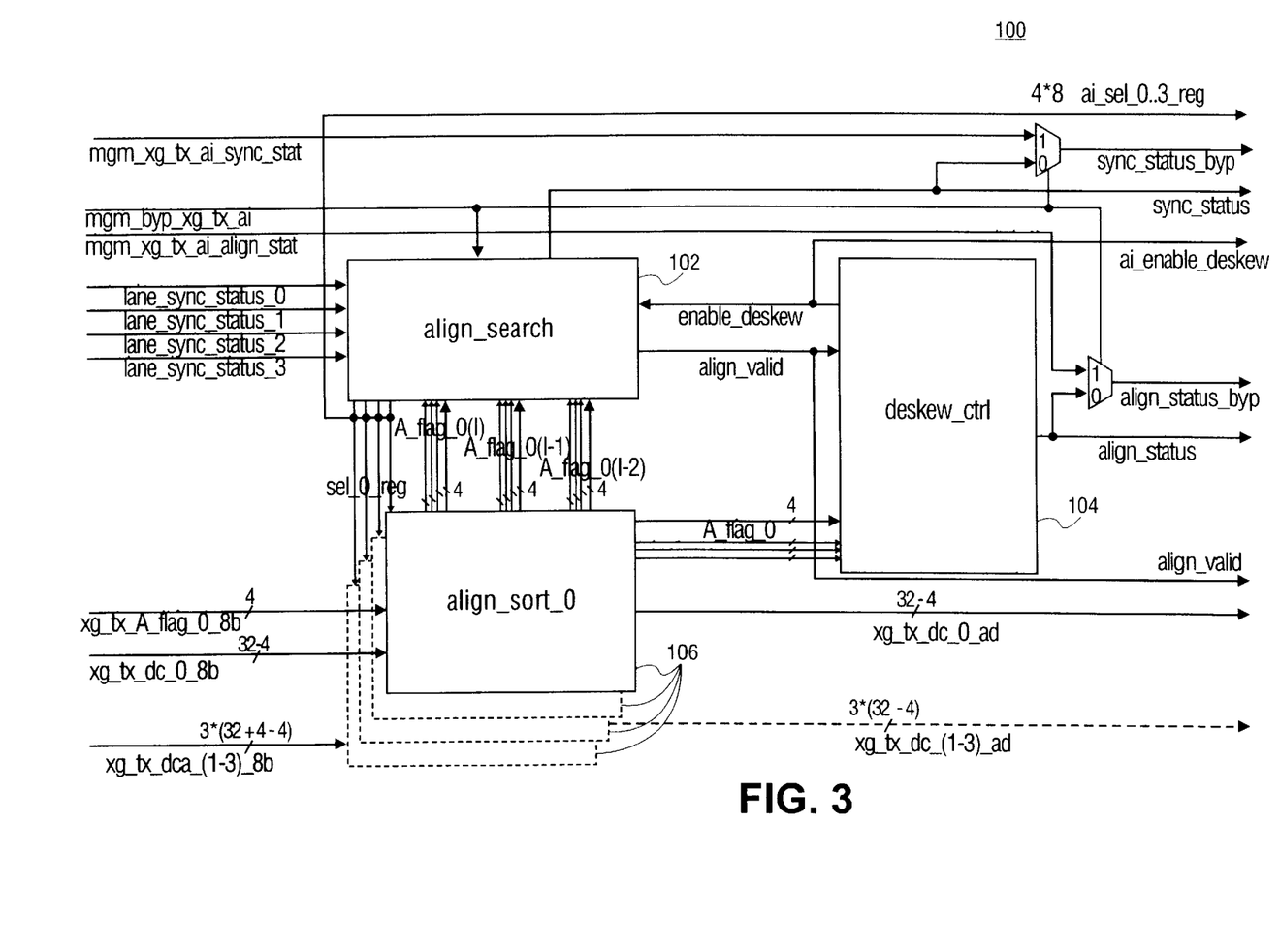
FIG. 3 shows an alignment and deskew section according to an embodiment of the receiving portion shown in FIG. 2.

FIG. 3 shows an alignment and deskew section 100 according to an embodiment of the receiving portion shown in FIG. 2. A deskew control section 104 may initiate an alignment search process by asserting a signal enable_deskew. For each data lane, a corresponding alignment sort section 106 receives the forty bit parallel data input xg_tx_dca_x_8b on each data cycle and provides a corresponding output xg_tx_dc_x_ad. Each alignment sort section 106 examines a four bit field comprising a four bit alignment vector A_flag for three consecutive data cycles (t, t-1 and t-2) to be provided to an alignment search section 102. In response, the alignment search section 102 may provide an alignment selection signal sel_reg to each alignment sort section 106 to indicate an alignment position for the corresponding output xg_tx_dc_x_ad. In response to a corresponding alignment selection signal sel_reg, each alignment sort section 106 may provide a thirty-six bit output xg_tx_dc_x_ad for a data lane which is aligned with data output from the other alignment sort sections 106 for the other data lanes, and a four bit alignment vector A_flag.

Figure 4:
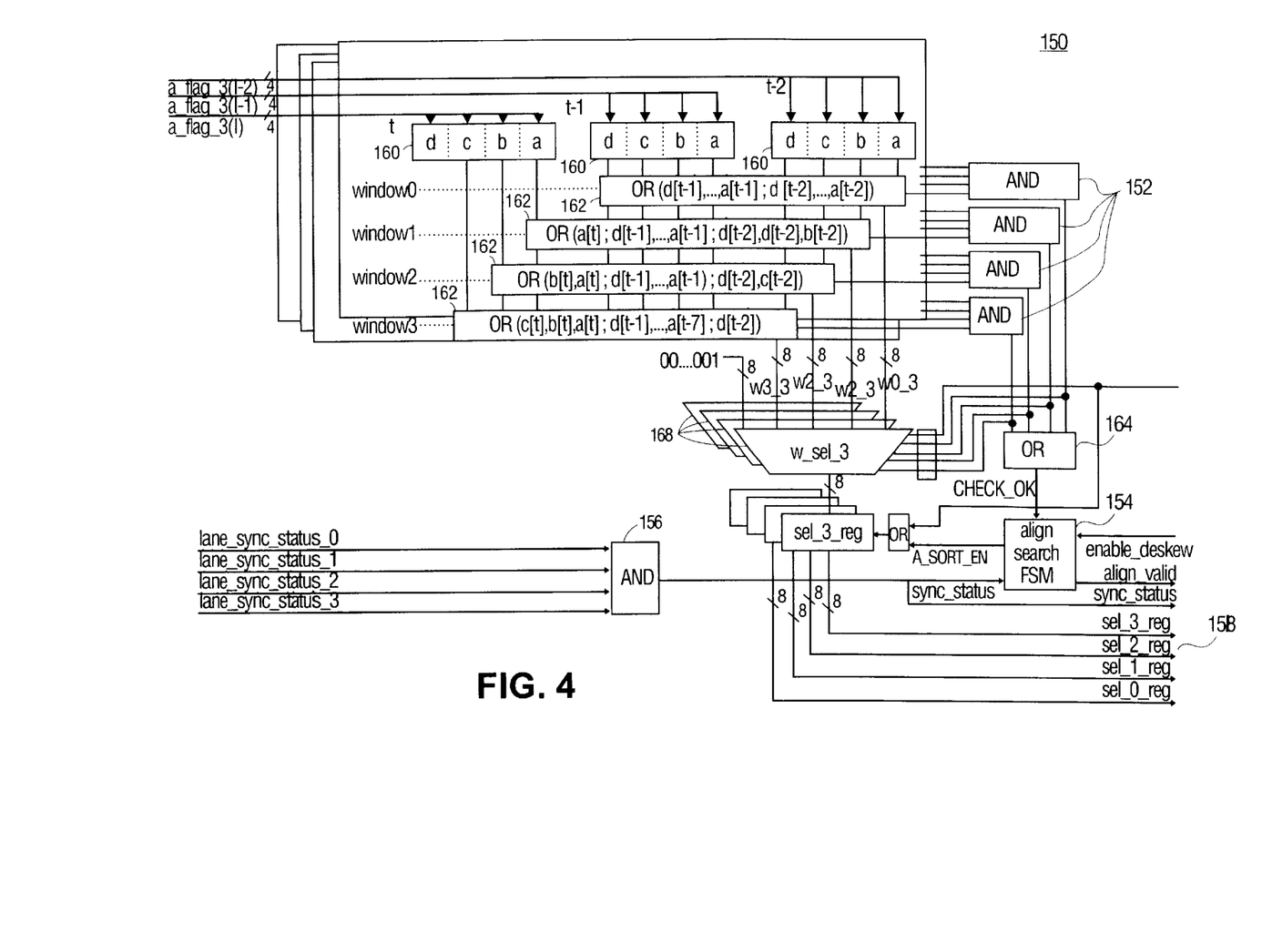
FIG. 4 shows an alignment search circuit according to an embodiment of the alignment and deskew section shown in FIG. 4.

FIG. 4 shows an alignment search circuit 150 according to an embodiment of the alignment search circuit 102 shown in FIG. 3. The receiver 52 may set a signal lane_sync_status for each data lane in response to detection of a stable "comma" character for the data lane to indicate bit level alignment at the decoder. An AND gate 156 receives the link_sync_status signals from the receiver 52 for each data lane and provides a combined result to an alignment search finite state machine (FSM) 154.

The alignment search circuit 150 also provides an alignment selection signal sel_reg 158 for each data lane. For each data lane, the alignment search circuit 150 defines four eighty-bit overlapping alignment windows where each alignment window straddles two or more forty-bit temporal segments. For each alignment window, an OR gate 162 receives portions of an alignment vector A_flag at data cycle times t, t-1 or t-2. In the presently illustrated embodiment, forty bit temporal segments of data xg_tx_dca_x_8b are provided at the alignment and deskew control section 54 on a data lane for each data cycle time. Each of four alignment flags (shown as a, b, c or d) in an alignment vector A_flag identify the presence (as a "1") or absence (as a "0") of an alignment character in a corresponding ten-bit segment of the input xg_tx_dca_x_8b to a data lane. Accordingly, the four windows span twelve ten-bit intervals where adjacent windows overlap by seventy bits.

Each OR gate 162 detects the presence of an alignment character in a corresponding window from alignment vectors A_flag. Each of a plurality of AND gates 152 receives the outputs of OR gates 162 from each data lane at a particular window associated with the AND gate 152. Each AND gate 152 detects the presence of an alignment character in a corresponding eighty-bit alignment window for each of the four data lanes. The align search FSM 154 receives an indication from an OR gate 164 of a detection of an alignment character for each data lane on at least one common eighty-bit alignment window.

Each of the OR gates 162 forwards its input (i.e., portions of time shifted alignment vectors A_flag) to a multiplexer 168. A minimum spacing of consecutive alignment characters in a data lane (e.g., a minimum of spacing of sixteen non-alignment characters as shown in the presently illustrated embodiment) may provide inputs to the OR gates 162 as "one hot" eight bit words where a single set bit indicates a portion in which an alignment character is detected. If an alignment character is detected in an alignment window for each of the data lanes, an AND gate 152 corresponding to the window will cause a multiplexer 168 for each data lane to output a corresponding one hot eight bit vector as an alignment selection vector sel_reg 158 corresponding to the data lane.

Figure 5:
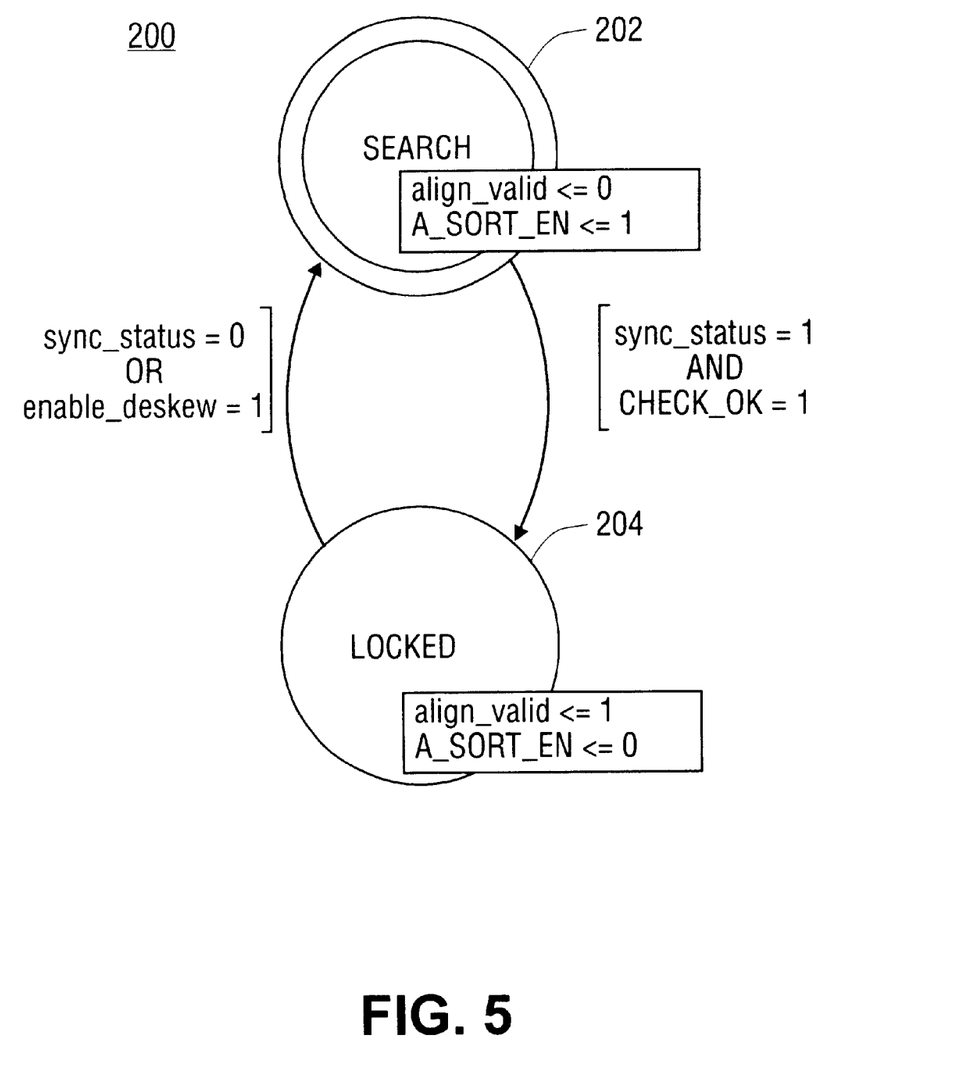
FIG. 5 shows a state diagram illustrating states of a finite state machine according to an embodiment of the alignment search circuit shown in FIG. 4.

FIG. 5 shows a state diagram illustrating states of the align search FSM 154 according to an embodiment of the alignment search circuit 150 shown in FIG. 4. When an align_valid signal is asserted, the deskew_control section 104 may begin observing data received from the link and suspend observing data from the link when the align_valid signal is de-asserted. The align search FSM 154 may be in either a locked state 204 or a search state 202. The align search FSM 154 may transition to the search state 202 in response to a synch_status output of the AND gate 156 becoming low or the enable_deskew signal being asserted by the deskew enable circuit 104. While in the search state 202, the align search FSM 154 may cause the align_valid signal to be low while setting the signal A_SORT_EN (enabling the writing of the registers sel_0..3_reg while FSM 154 is in the search state). While in the locked state 204, A_SORT_EN may be de-asserted while the last eight bit values in registers sel_0..3_reg are stored.

The align search FSM 154 may transition to the locked state 204 in response to setting of synch_status from the and gate 156 and setting of CHECK_OK from OR gate 164 indicating detection of an alignment character in a common window for each of the data lanes. While in the locked state 204, the align search FSM 154 may assert the signal align_valid and de-assert A_SORT_EN.

Figure 6:
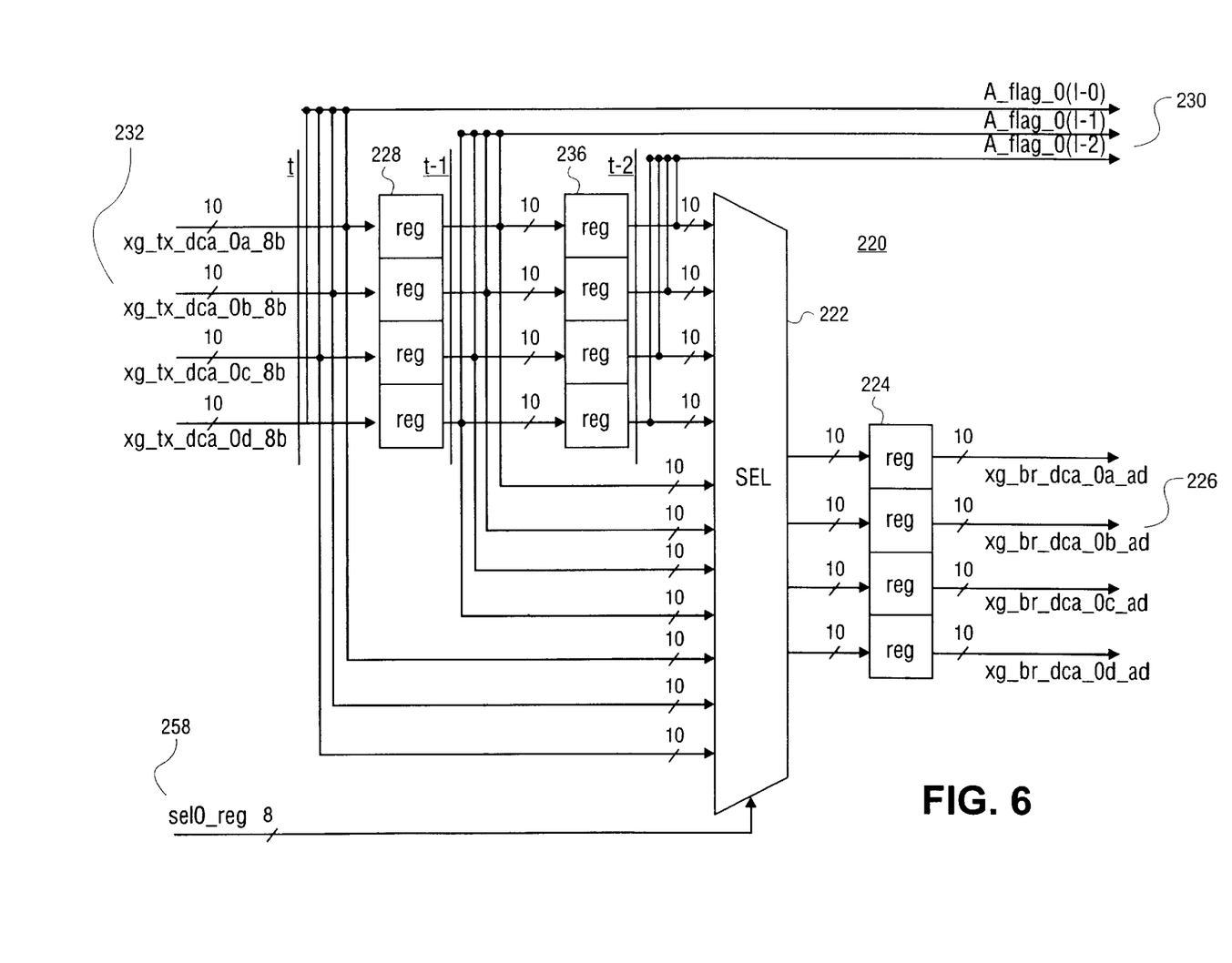
FIG. 6 shows an alignment sort circuit according to an embodiment of the alignment and deskew section shown in FIG. 4.

FIG. 6 shows an alignment sort circuit 220 according to an embodiment of the alignment sort circuits 106 shown in FIG. 3. In the illustrated embodiment, each data lane is associated with an alignment sort circuit 220 to provide aligned data in response to a corresponding alignment selection vector 258 generated by the align search section 102. In the illustrated embodiment, a forty bit aligned output 226 may be provided from any one of eight possible selections of forty adjacent bits based upon the one hot alignment selection vector sel_reg.

On each data cycle, the alignment sort circuit 220 receives four ten bit portions xg_tx_dca_0x_8b of the forty bit temporal segment. Thirty bits of the forty bit input 232 are forwarded to a multiplexer 222. Delay registers 228 and 236 also provide delayed versions of the forty bit input 232 on subsequent data cycles such that the multiplexer 222 receives eleven consecutive ten-bit portions of the data received on a data lane straddling three temporal segments. The multiplexer 222 may then select four consecutive ten-bit portions as an aligned output 226 in response to sel_reg. Bits for each of the alignment vectors 230 may be provided from fixed bit locations in each of the ten bit inputs xg_tx_dca_0b_8b.

Figure 7:
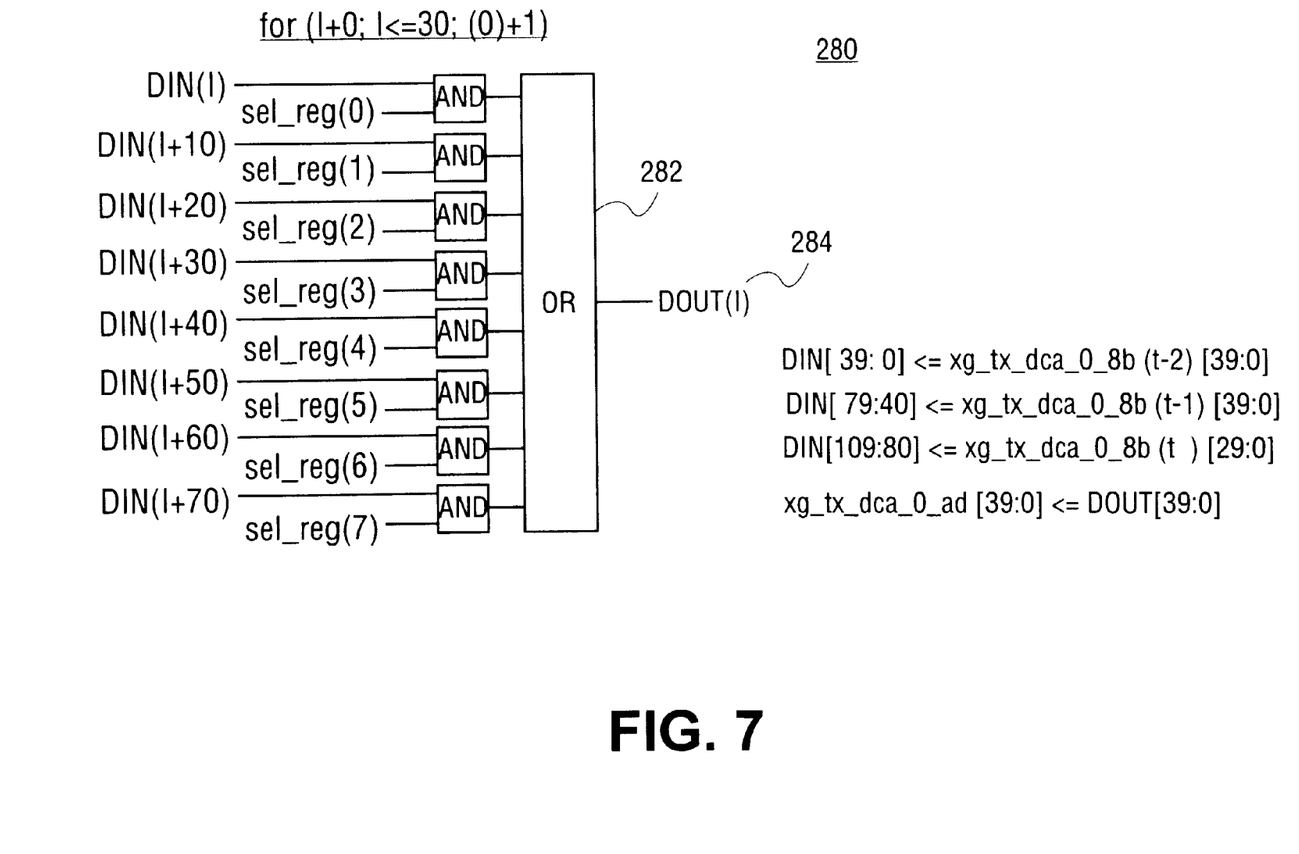
FIG. 7 shows a selection circuit to select an alignment for a data lane according to an embodiment of the alignment sort circuit shown in FIG. 6.

FIG. 7 shows a selection circuit 280 to select aligned for a data lane according to an embodiment of the multiplexer 222 in the alignment sort circuit 220 shown in FIG. 6. In the presently illustrated embodiment, the selection circuit 280 may be replicated or instantiated forty times in the alignment sort circuit 220 such that each replication or instantiation of the selection circuit 280 provides one bit DOUT[i] of the aligned forty bit output 226. Each bit of the one hot selection vector sel_reg is provided as a first input to a corresponding AND gate while a second input to the AND gate is a bit from the 110 bit input to the selection register 222. The second inputs to the AND gates are provided at ten bit offsets such that output 284 provides one of forty bits in the output 226 associated with the "hot" bit of sel_reg.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method comprising:
generating one or more alignment vectors for each of a plurality of data lanes, each alignment vector comprising information representing a location of an alignment character in an associated one of the data lanes;
for each data lane, associating a plurality of alignment vectors generated from the data lane to identify one or more alignment windows associated with the data lane;
associating respective alignment windows associated with the data lanes to detect a common alignment window;
determining an alignment position from among a plurality of alignment positions for each data lane in response to detecting the common alignment window;
segmenting data from each of the data lanes into temporal segments comprising a fixed number of bits;
generating an alignment vector for each temporal segment of each data lane; and
selecting the alignment window for each data lane from among a plurality of overlapping alignment windows based upon a plurality of alignment vectors generated from the data lane.

2. The method of claim 1, wherein the alignment vector comprises a plurality of bits, each bit representing one of a presence and an absence of an alignment character in a portion of a temporal segment associated with the alignment vector.

3. The method of claim 1, wherein each alignment window spans portions of at least two temporal segments.

4. The method of claim 1, the method further comprising resetting a search process in response to an absence of a common alignment window.

5. An apparatus for deskewing data lanes, the apparatus comprising:
an alignment search circuit to associate a plurality of alignment vectors of each data lane to identify one or more alignment windows associated with the data lane, each alignment vector comprising information representing a location of an alignment character in an associated one of the data lanes, and to detect a common alignment window among alignment windows associated with the respective data lanes; and
an alignment sort circuit to determine, for each data lane, an alignment position from among a plurality of alignment positions in response to detecting the common alignment window,
wherein the alignment search circuit further comprises:
logic to segment data from each of the data lanes into temporal segments comprising a fixed number of bits; and
logic to select the alignment window for each data lane from among a plurality of overlapping alignment windows based upon a plurality of alignment vectors generated from the data lane.

6. The apparatus of claim 5, wherein the alignment sort circuit comprises logic to generate an alignment vector for each temporal segment of each data lane.

7. The apparatus of claim 6, wherein the alignment vector comprises a plurality of bits, each bit representing one of a presence and an absence of an alignment character in a portion of a temporal segment associated with the alignment vector.

8. The apparatus of claim 6, wherein each alignment window spans portions of at least two temporal segments.

9. The apparatus of claim 5, wherein the alignment search circuit further comprises logic to reset a search process in response to an absence of a common alignment window.

10. A system comprising:
a first extended sublayer circuit coupled to an MII to generate a plurality of data lanes; and
a second extended sublayer circuit comprising:
a decoder circuit to generate one or more alignment vectors for each of the data lanes, each alignment vector comprising information representing a location of an alignment character in an associated one of the data lanes;

an alignment search circuit to associate a plurality of alignment vectors of each data lane to identify one or more alignment windows associated with the data lane, and to detect a common alignment window among alignment windows associated with the respective data lanes; and an alignment sort circuit to determine, for each data lane, an alignment position from among a plurality of alignment positions in response to detecting the common alignment window, wherein the alignment search circuit further comprises:

logic to segment data from each of the data lanes into temporal segments comprising a fixed number of bits; and logic to select the alignment window for each data lane from among a plurality of overlapping alignment windows based upon a plurality of alignment vectors generated from the data lane.

11. The system of claim 10, the system further comprising a media access controller coupled to the MII.

12. The system of claim 11, wherein the system further comprises a switch fabric coupled to the media access controller.

13. The system of claim 11, wherein the system further comprises a multiplexed data bus coupled to the media access controller.

14. The system of claim 10, the system further comprising an optical transmission medium coupled to the second extended sublayer circuit through a physical coding sublayer circuit.

15. The system of claim 10, wherein the alignment sort circuit comprises logic to generate an alignment vector for each temporal segment of each data lane.

16. The system of claim 15, wherein the alignment vector comprises a plurality of bits, each bit representing one of a presence and an absence of an alignment character in a portion of a temporal segment associated with the alignment vector.

17. The system of claim 15, wherein each alignment window spans portions of at least two temporal segments.

18. The system of claim 10, wherein the alignment search circuit further comprises logic to reset a search process in response to an absence of a common alignment window.

19. A system comprising:

a link layer device; and a physical layer device coupled to the link layer device by a system packet interface (SPI) comprising a plurality of data lanes, the physical layer device comprising:

an alignment search circuit to associate a plurality of alignment vectors of each data lane to identify one or more alignment windows associated with the data lane, and to detect a common alignment window among alignment windows associated with the respective data lanes; and an alignment sort circuit to determine, for each data lane, an alignment position from among a plurality of alignment positions in response to detecting the common alignment window, wherein the alignment search circuit further comprises:

logic to segment data from each of the data lanes into temporal segments comprising a fixed number of bits; and logic to select the alignment window for each data lane from among a plurality of overlapping alignment windows based upon a plurality of alignment vectors generated from the data lane.

20. The system of claim 19, wherein the physical layer device further comprises a framer.

21. The system of claim 20, wherein the physical layer device further comprises a serializer/deserializer coupled to the framer.

22. The system of claim 21, wherein the physical layer device further comprises an optical transceiver coupled to the serializer/deserializer.

23. The system of claim 19, wherein the system further comprises a switch fabric coupled to the link layer device.

24. The system of claim 19, wherein the system further comprises a multiplexed data bus coupled to the link layer device.

25. The system of claim 19, wherein the alignment sort circuit comprises logic to generate an alignment vector for each temporal segment of each data lane.

26. The system of claim 25, wherein the alignment vector comprises a plurality of bits, each bit representing one of a presence and an absence of an alignment character in a portion of a temporal segment associated with the alignment vector.

27. The system of claim 25, wherein each alignment window spans portions of at least two temporal segments.

28. The system of claim 19, wherein the alignment search circuit further comprises logic to reset a search process in response to an absence of a common alignment window.

* * * * *